United States Patent [19]
Burdisso et al.

[11] Patent Number: 5,884,736
[45] Date of Patent: Mar. 23, 1999

[54] ACTIVE DUAL REACTION MASS ABSORBER FOR VIBRATION CONTROL

[75] Inventors: Ricardo A. Burdisso, Blacksburg, Va.; John D. Heilmann, Erie, Pa.

[73] Assignee: Virginia Tech Intellectual Properties, Inc., Blacksburg, Va.

[21] Appl. No.: 825,614

[22] Filed: Mar. 31, 1997

[51] Int. Cl.⁶ .................................................. F16F 7/10
[52] U.S. Cl. .......................... 188/379; 267/136; 248/550
[58] Field of Search .................... 188/378, 379, 188/380; 248/550, 566; 267/136

[56] References Cited

U.S. PATENT DOCUMENTS

| | | |
|---|---|---|
| 3,088,062 | 4/1963 | Hudimac . |
| 3,490,556 | 1/1970 | Bennett, Jr. et al. . |
| 3,917,246 | 11/1975 | Garther et al. .................... 188/378 X |
| 4,083,433 | 4/1978 | Geohegan, Jr. et al. . |
| 4,550,812 | 11/1985 | Mard ....................................... 188/379 |
| 4,565,940 | 1/1986 | Hubbard, Jr. . |
| 4,635,892 | 1/1987 | Baker . |
| 4,673,170 | 6/1987 | Dykema . |
| 4,715,559 | 12/1987 | Fuller . |
| 4,724,923 | 2/1988 | Waterman ........................... 188/380 X |
| 4,757,980 | 7/1988 | Schubert . |
| 4,899,342 | 2/1990 | Potter et al. . |
| 4,922,159 | 5/1990 | Phillips . |
| 4,935,838 | 6/1990 | Barger et al. . |
| 4,940,914 | 7/1990 | Mizuno et al. . |
| 5,202,979 | 4/1993 | Hillis et al. . |
| 5,231,336 | 7/1993 | van Namen . |
| 5,251,863 | 10/1993 | Gossman et al. . |
| 5,251,883 | 10/1993 | Simon et al. . |
| 5,256,942 | 10/1993 | Wood . |
| 5,265,704 | 11/1993 | Landesfeind . |
| 5,310,137 | 5/1994 | Yoerkie, Jr. et al. . |
| 5,332,203 | 7/1994 | Gossman et al. . |
| 5,333,819 | 8/1994 | Stetson, Jr. . |
| 5,397,949 | 3/1995 | Guardiani et al. . |
| 5,419,528 | 5/1995 | Carter et al. . |
| 5,423,523 | 6/1995 | Gossman et al. . |
| 5,427,347 | 6/1995 | Swanson et al. . |
| 5,431,261 | 7/1995 | Olgac . |
| 5,433,422 | 7/1995 | Ross et al. . |
| 5,433,666 | 7/1995 | Graton et al. . |
| 5,447,001 | 9/1995 | Nishimura et al. . |
| 5,456,341 | 10/1995 | Garnjost et al. . |
| 5,505,282 | 4/1996 | Olgac . |
| 5,713,438 | 2/1998 | Rossetti et al. ........................... 188/378 |

FOREIGN PATENT DOCUMENTS

| | | |
|---|---|---|
| 0554057 A1 | 8/1993 | European Pat. Off. . |
| 2705416 | 5/1993 | France . |
| 58-74931 | 5/1983 | Japan . |
| 62-288743 | 12/1987 | Japan . |
| WO 92/02382 | 2/1992 | WIPO . |
| WO 96/12121 | 4/1996 | WIPO . |

OTHER PUBLICATIONS

Nishimura et al., An Intelligent Tuned Mass Damper; Kobori Research Complex, Kajima Corp.; AIAA–93–1709–CP; 1993; pp. 3561–3569.

*Primary Examiner*—Lee W. Young
*Attorney, Agent, or Firm*—Whitham, Curtis&Whitham

[57] ABSTRACT

An active vibration absorber including a frame connected to a structure to be controlled and at least two reaction mass elements operatively connected to the frame. Each of the reaction mass elements is independently movable with respect to said frame. The absorber includes a force generating member for controlling relative movement between the reaction mass elements for damping vibration of the structure. The inventive dual reactive mass absorber requires less control force to produce the same vibration attenuation as conventional single reactive mass absorbers.

11 Claims, 11 Drawing Sheets

ACTIVE DUAL REACTION MASS ABSORBER FOR VIBRATION CONTROL

BACKGROUND OF THE INVENTION

1. Field of the Invention

The present invention generally relates to vibration absorbers and, more specifically, to an active dual mass absorber for vibration control.

2. Description of the Related Art

Dynamic passive vibration absorbers have been successfully used in industry to attenuate structural vibration for both narrow and broad-band excitations. The invention is directed to a device which is used in an active control methodology for damping vibrations (e.g., engine sounds and vibrations in aircraft, vibrations on buildings, vibrations emanating from power plants, etc.).

More recently, the performance of these passive devices has been enhanced through the addition of an active component. Currently available dynamic vibration absorbers utilize a single reaction mass connected to the structure to be controlled, wherein the active force is applied between the reaction mass and the structure to be controlled.

The active component in a conventional vibration absorber consists of a self-balanced force generating member applied between the absorber mass and the structure to be controlled. The force generating member generally exerts an equal force in opposite directions and could include any common device, such as piezoelectric patches, electromagnetic devices, and so forth. Such a conventional structure is sometimes referred to herein as a single mass (single reaction mass) absorber.

Such conventional hybrid passive/active dynamic vibration absorbers provide improved response attenuation over that achieved by the passive system at the expense of the energy added to the system via the control force. The required control effort is a function of both the absorber mass and the frequency tuning (i.e. the ratio of the absorber's frequency to the structure's natural frequency).

A detuned absorber requires larger control forces than a tuned absorber. In some applications, these drawbacks limit the implementation of hybrid absorbers due to constraints in size, weight, and/or required control force magnitudes.

FIG. 1 is a schematic illustration of a conventional single active dynamic vibration absorber ("DVA") or reaction mass system. This system consists of a single reaction mass 10 attached to the structure to be controlled 11, 14, 15 through a spring 12 and damper 13 system. The structure to be controlled may be represented by a mass-spring-damper system 11, 14, 15.

In the system illustrated in FIG. 1, an active force is applied by a force generating member 16 between the reaction mass 10 and the structure to be controlled 11. A motion sensor 17 detects the motion of the structure 11 and relays this information to the force generating member 16 via a filter compensator 19 and line 18.

In operation, a disturbance force F(t) acts on the structure 11. Motion sensor 17 senses the motion of structure 11 and, by an operation known as "feedback", supplies the force generating member 16 with a signal via filter 19 and line 18. Force generating member 16 applies equal and opposite forces to the reaction mass 10 and the structure 11 to eliminate the movement of member 11.

A similar operation known as "feedforward" is substantially similar to the feedback operation, except that the line 18 is connected to element causing the disturbance force F(t) (not illustrated) and the filter 19 is adjusted. The signal from the motion sensor 17 changes the force F(t) to damp the movement of the structure 11.

SUMMARY OF THE INVENTION

It is, therefore, an object of the present invention to provide a new absorber device for the control of noise and vibration. The inventive absorber consists of two reaction masses connected to the structure to be controlled through two spring-damper systems (i.e. one for each mass). In the inventive system, the two masses could also be structurally coupled to each other by another spring-damper system.

The active component could consist of a pair of equal and opposite force generating members between the two masses, such that a separate force acts on each mass. The generating member could include any common device, such as a piezoelectric patch, an electromagnetic device, and so forth.

The inventive absorber is superior to the conventional single reaction mass absorber because the inventive absorber utilizes a single active force generator between multiple reaction masses while the conventional absorber utilizes a single active force generator between a single reaction mass and the structure to be controlled. The invention could also consist of more than two reaction masses with multiple active force generating members between them.

The invention includes an absorber with two reaction masses and a unique arrangement for implementing the active force. A key feature of the inventive structure is that the control force required is significantly smaller than the control force required for a single reaction mass system. This allows the components of the inventive device to be smaller, lighter, and more compact than the conventional single mass systems.

Furthermore, the arrangement allows the inventive configuration to be effective over a wider frequency range, and to be less sensitive to system parameter changes than the conventional single absorber arrangements.

With the invention, the active force is applied between the reaction masses rather than between a reaction mass and the structure being controlled. Simulation studies have demonstrated that the active force required in the inventive system is nearly one-fourth that required for the conventional dynamic vibration absorber.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
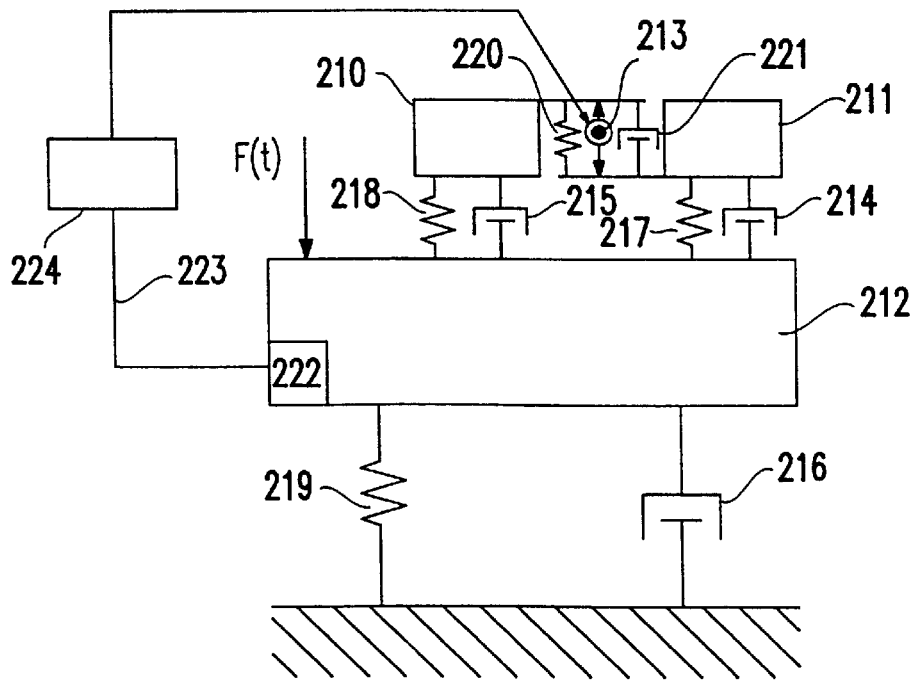
FIG. 2 is a schematic illustration of a dual reactive mass absorber according to the invention.

Referring now to the drawings, and more particularly to FIG. 2, the inventive absorber includes two reaction mass elements 210, 211 attached to the primary structure which is to be controlled modeled as a mass 212, a spring 219 and a damper 216. A force generating member 213 is located between the reaction masses 210, 211.

Figure 1:
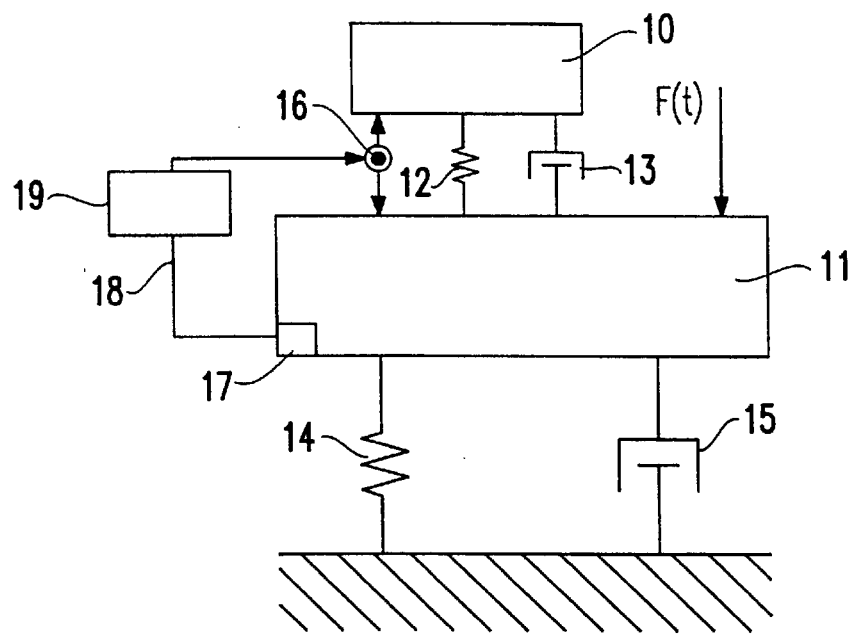
FIG. 1 is a schematic illustration of a single reactive mass absorber.

This structure, sometimes referred to herein as a dual-mass (DM) absorber, is fundamentally different than the single-mass (SM) absorber in FIG. 1 because the inventive structure includes multiple reaction masses 210, 211 and a force generating m ember 213 positioned between the reaction masses and not between the single reaction mass 10 and the structure 11, as in the conventional absorber.

The inventive absorber could also include more than two masses depending upon the specific application, as would be known to one ordinarily skilled in the art given this disclosure. Similarly, multiple force generating units could be used to exert a force upon the reactive mass elements instead of the single force generating member 213 illustrated in FIG. 2. Only two masses and a single force generating member are illustrated in the drawings for ease of understanding.

In operation, the motion sensor 222 in FIG. 2 senses the motion of the structure 212 and transmits this information via filter 224 and line 223 to the force generating member 213. The force generating member applies an equal and opposite force to each of the reaction masses 210, 211. The reaction masses 210, 211 move in a manner to eliminate the motion of the structure 212 by transmitting force through the springs 217, 218 and dampers 214, 215.

As discussed with respect to the structure shown in FIG. 1, the active force applied to the two reaction masses 210, 211 by the force generating means 213 can be implemented using any control algorithm, i.e. feedback, feedforward, and so forth, as is readily known by those ordinarily skilled in the art.

Figure 3:
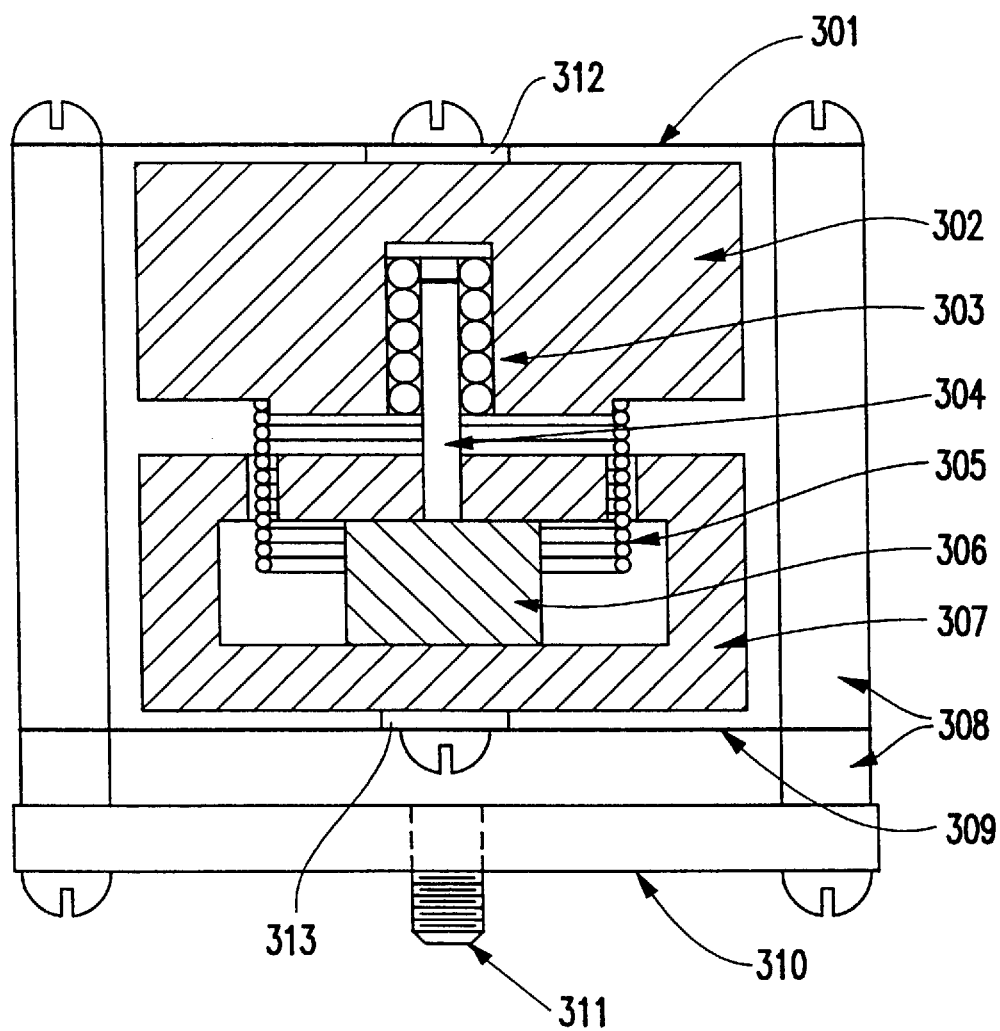
FIG. 3 is a cross-sectional schematic illustration of a dual reactive mass absorber according to the invention.

A schematic of a preferred embodiment of the inventive dual mass absorber is shown in FIG. 3. The device comprises two reaction masses 302, 307 that are attached to a structure to be controlled (not illustrated) by an attachment stud 311. The two masses are linked to the attachment stud 311 through a spring-damper system comprising plate springs 301, 309, stiff spacers 308 and a stiff base plate 310.

The two reaction masses 302, 307 are, in the preferred embodiment made of steel but could be made of any suitable substance. In the preferred embodiment, each reaction mass is attached to the plate springs 301, 309 through stiff connectors 312, 313. However, any spring-damper system can be used, such as helical springs and so forth.

The top reaction mass 302 has a 2.5 cm voice coil 305 attached to the lower face. The lower reaction mass 307 has a rare-earth magnet 306 attached which generates a strong magnetic flow in the lower reaction mass.

By inducing a current in the voice coil 305, an active force is generated between the two masses. A linear bearing 303 is used to maintain the axial motion of the two masses, (i.e. restrain the rotation of the masses).

While the preferred embodiment is illustrated in FIG. 3, the active control force could be implemented using various approaches depending on the application, as would be known to one ordinarily skilled in the art. For example, for large structures, such as buildings and bridges, the active force could be generated with hydraulic systems.

The invention is sometime referred to herein as a dual coupled reaction mass absorber or dual active dynamic vibration absorber (DADVA), for the active control of structural vibrations. The required control force to attenuate the response of the structure is significantly smaller for the dual mass system when compared to the single reaction mass system. Therefore, the components of the active system (for example the voice coil, rare-earth magnet element, power amplifiers, and so forth) can be designed to be smaller, more compact, and lighter than the equivalent single mass system presently used.

This is a critical issue in the control of vibration and sound inside the fuselage of, for example, airplanes where weight is of paramount concern. It is also very important in the control of massive systems such as buildings, bridges, large engines and so forth where it is highly desirable to reduce the required control forces.

Other advantages of the dual reaction mass absorber include that the inventive system is effective over a wider frequency range and is less sensitive to system parameter changes than the single reaction mass absorber.

Analytical and experimental work has demonstrated that the inventive dual reaction mass absorber requires smaller control forces than an equivalent single reaction mass absorber. Specifically, the performance of the dual reaction mass absorber illustrated in FIG. 3 was tested using the following experimental setup.

A steel beam (25×38 mm cross section and 1.15 m length) was clamped to a granite table. The beam was excited using a Ling Dynamic Systems shaker driven with white noise over the [0–200 Hz] band. The shaker was attached 0.64m from the base of the beam. A PCB force transducer was used to measure the excitation force from the shaker. The error signal was obtained from a PCB accelerometer mounted at the free end of the beam. The absorber was also mounted at the free end of the beam.

The dual reaction mass absorber consisted of two steel masses 302, 307 attached to metal plates 301, 309 that were then mounted to a rigid housing 308, 310 as shown in FIG. 3. The thickness of the metal plates 301, 309 dictated their spring constants. The control forces were implemented with a voice coil/rare-earth magnet 305, 306.

For convenience, the single reaction mass absorber was implemented by replacing one of the metal springs 310, 309 with a thicker plate which effectively locked one of the reaction masses to the primary structure. Although this halved the mass of the single reaction mass absorber, the effect of a reduced reaction mass on the required control force is only important at the absorber's resonance. Therefore, the single reaction mass absorber was equivalent in size to the dual reaction mass absorber in this experiment.

The control approach used was the adaptive Filtered-X LMS algorithm, which is well known to those skilled in the art, where the output from the function generator was used as the reference signal. The compensator was implemented with a finite impulse response filter of order 255 and with a sampling frequency of 300 Hz. The first three natural frequencies of the beam were at 13, 86, and 242 Hz. The properties of both the dual reaction mass and single reaction mass absorbers were selected to attenuate the second mode of the beam.

The single reaction mass absorber was tuned to 82 Hz with a damping ratio or 3.6%. The tuning ratio of f(t),f2= 0.95 was nearly optimal for the absorber-beam mass ratio of 3% of the single reaction mass absorber.

The dual reaction mass absorber was designed to have natural frequencies below and above the beam's second resonance. The resonances of the dual reaction mass absorber were at 61 and 96 Hz, with modal damping ratios of 4.5 and 2.6%, respectively. The total mass ratio for the dual reaction mass absorber was 5.4%.

In contrast to the single reaction mass absorber parameters, none of the dual reaction mass absorber parameter were optimal. The spectra of the error accelerometer for the beam with and without the absorber (configured in both the dual reaction mass and single reaction mass modes) were measured. The control voltage driving the absorber in each mode was also measured. The results were normalized by the input disturbance force.

Briefly, FIGS. 5A, 6A, 7A, 8A, 9 and 10 show the results using a single reaction mass absorber. FIGS. 5B, 6B, 7B, 8B, 9 and 10 show the results using the inventive dual reaction mass absorber.

Figure 4:
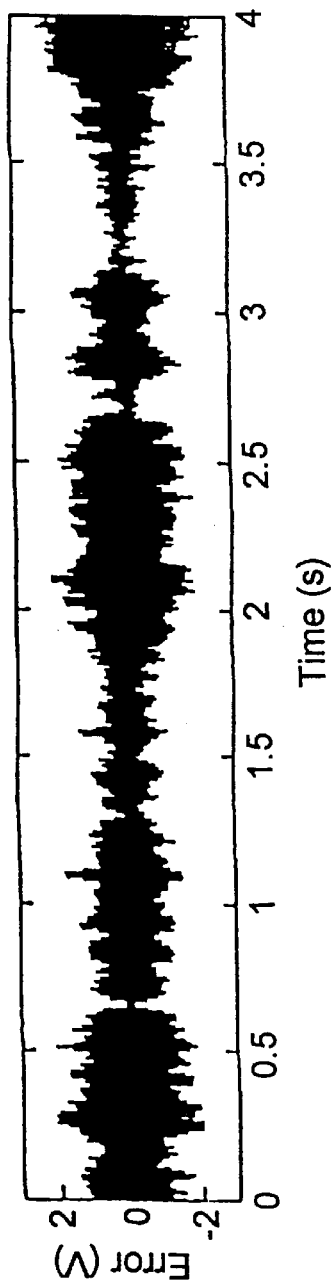
FIG. 4 is a graphic illustration of an error signal from an original undamped vibrating beam (experimental results)
Figure 5A:
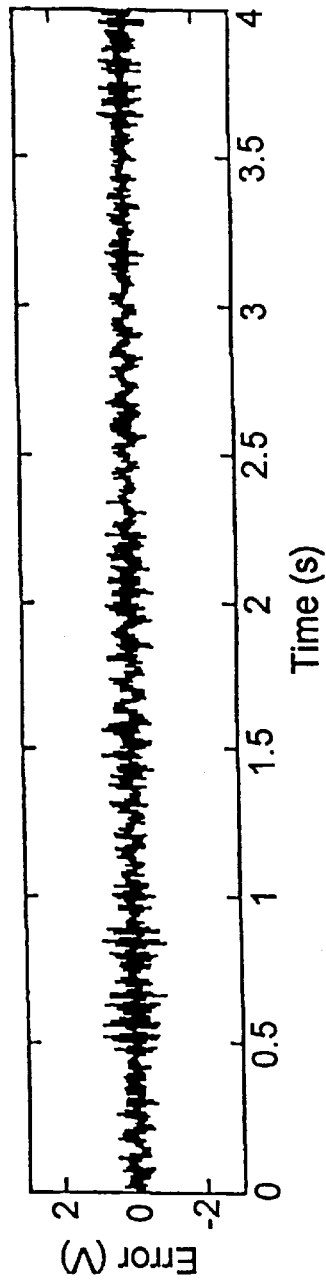
FIG. 5A is a graphic illustration of the error signal illustrated in FIG. 4 that is damped with a passive single reactive mass absorber (experimental results)
Figure 6A:
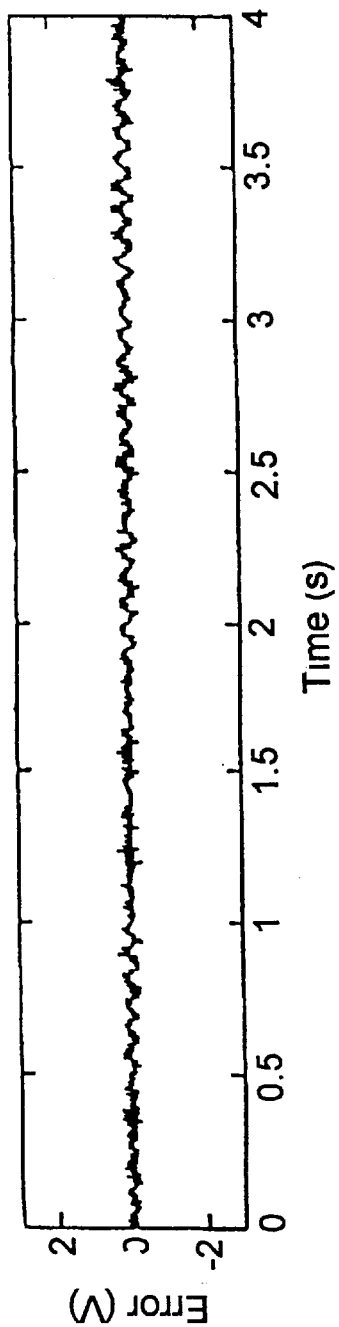
FIG. 6A is a graphic illustration of the error signal illustrated in FIG. 4 that is damped with an active single reactive mass absorber (experimental results)
Figure 7A:
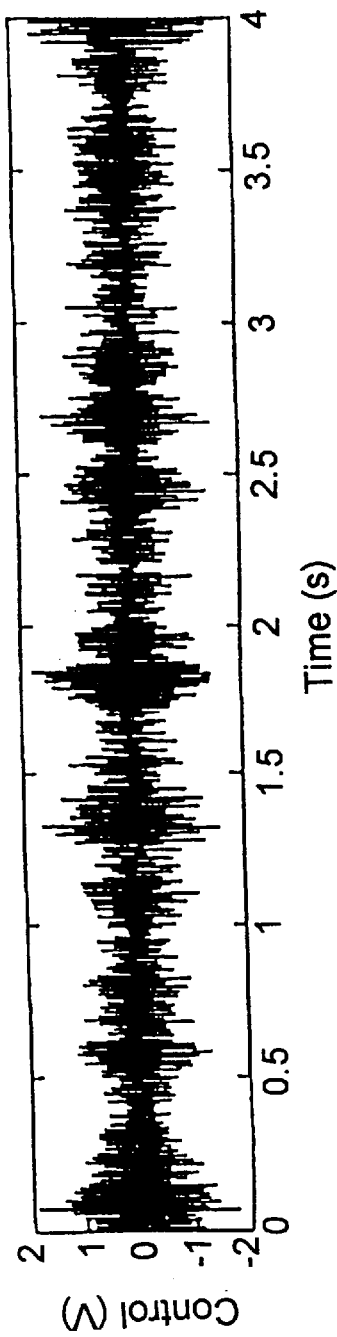
FIG. 7A is a graphic illustration of the control signal for the active single reactive mass absorber used to produce FIG. 6A (experimental results)

FIG. 4 shows the time history of the error signal for the original undamped system. FIG. 5A illustrates the attenuated response of the beam with the passive single reaction mass absorber and shows good attenuation. FIG. 6A shows the response with the active single reaction mass absorber. These figures illustrate that the active absorber further attenuated the beam response. FIG. 7A shows the time history of the control signal voltage applied to the active single reaction mass absorber.

Figure 5B:
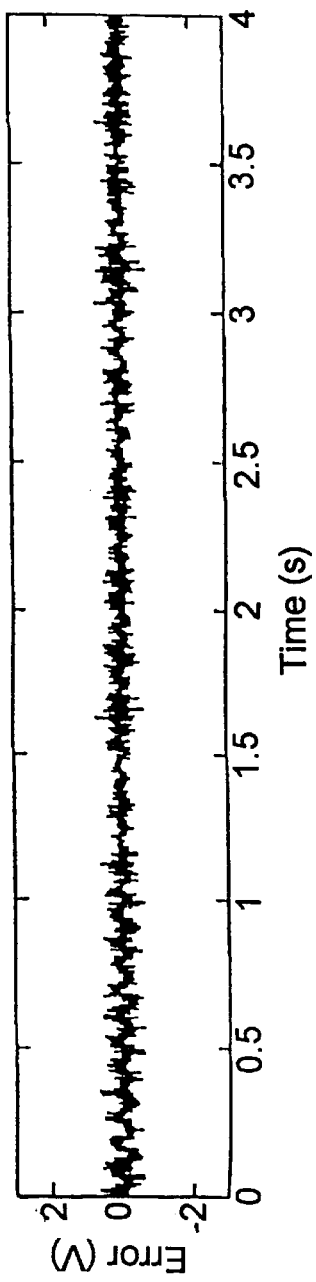
FIG. 5B is a graphic illustration of the error signal illustrated in FIG. 4 that is damped with a passive dual reactive mass absorber according to the invention (experimental results)

FIG. 5B shows the time history of the error signal with the passive dual reaction mass absorber, which indicates similar levels of attenuation as the single reaction mass absorber in FIG. 5A.

Figure 6B:
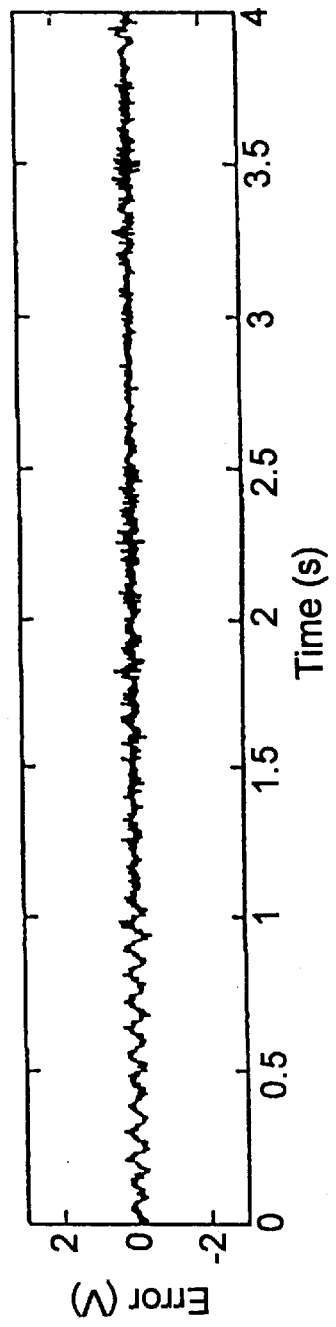
FIG. 6B is a graphic illustration of the error signal illustrated in FIG. 4 that is damped with an active dual reactive mass absorber according to the invention (experimental results)
Figure 7B:
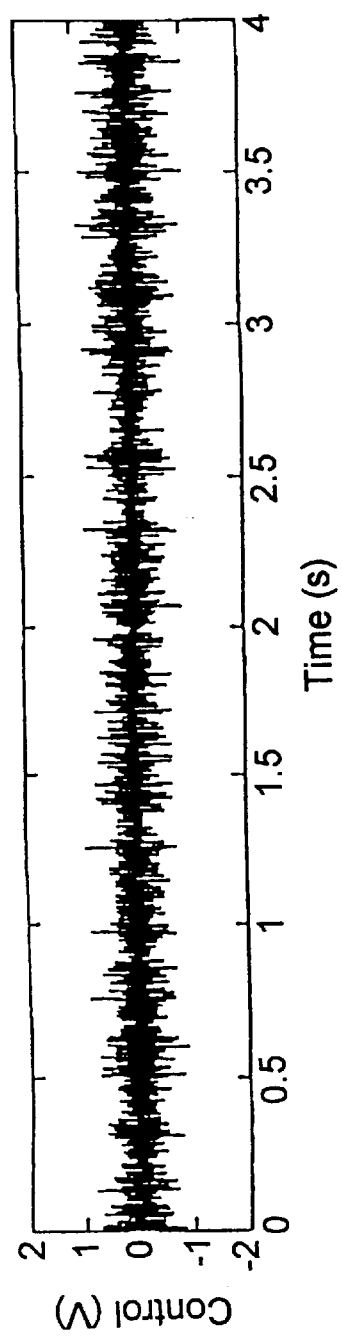
FIG. 7B is a graphic illustration of the control signal for the active dual reactive mass absorber according to the invention used to produce FIG. 6B (experimental results)

FIG. 6B shows the response of the beam with the active dual reaction mass absorber. FIG. 7B shows the time history of the control signal voltage applied to the active dual reaction mass absorber. Comparison of FIGS. 6A and 6B shows that similar attenuation was achieved using both the single reaction mass and dual reaction mass active absorbers.

Figure 9:
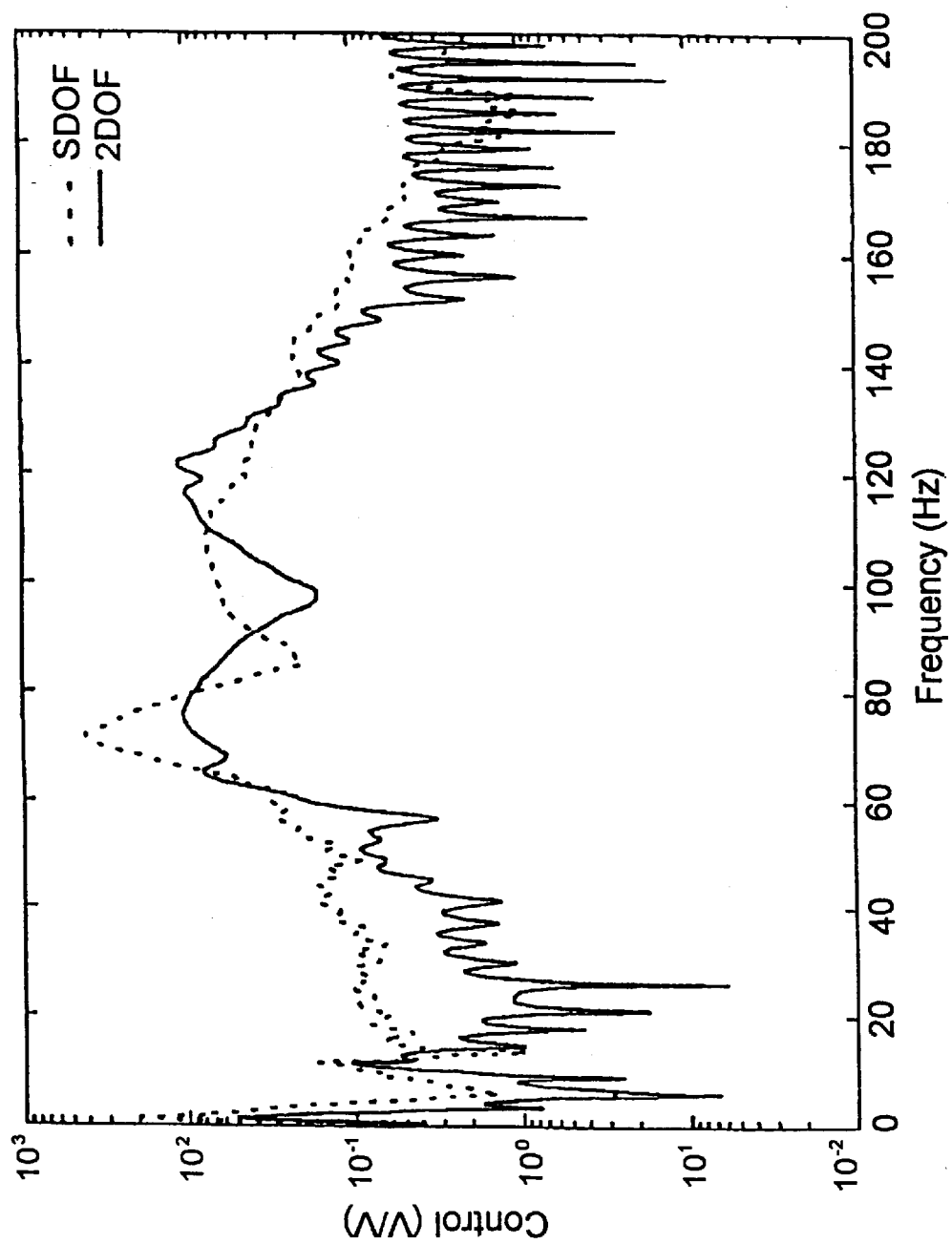
FIG. 9 is a graphic illustration of a normalized control signal voltage spectra for a single reactive mass absorber and a dual reactive mass absorber according to the invention (experimental results)

Comparison of FIGS. 7A and 7B illustrate that the control force required by the dual reaction mass is substantially less (about half) than that required by the single reaction mass absorber to achieve similar structural attenuation. The spectra of the control signals required by each absorber, normalized by the shaker force, are shown in FIG. 9.

The control force for the single mass absorber was higher than that required by the dual mass absorber over almost the entire frequency range as shown by FIGS. 7A and 7B. Thus, the dual mass absorber provided better error signal reduction with less control force than the optimally tuned single mass absorber. Indeed, as illustrated in the figures, the control force required by the inventive dual reaction mass absorber is nearly half that of the conventional single reaction mass absorber.

Figure 8A:
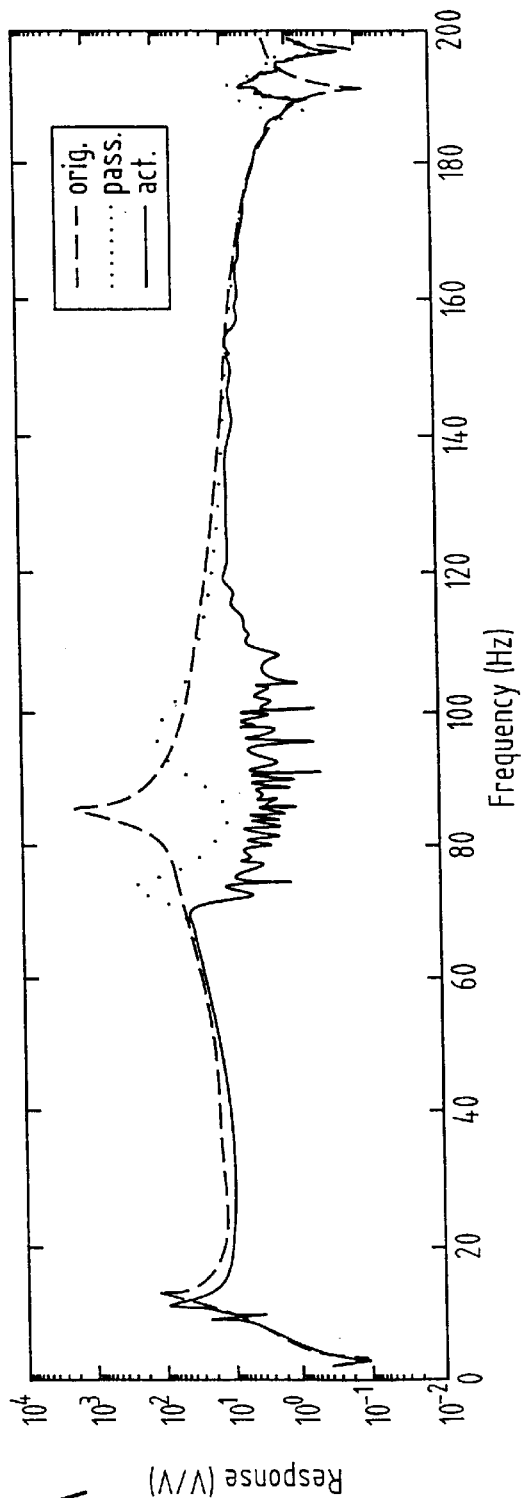
FIG. 8A is a graphic illustration of three normalized error signal response spectra associated with a single reactive mass absorber (experimental results)
Figure 8B:
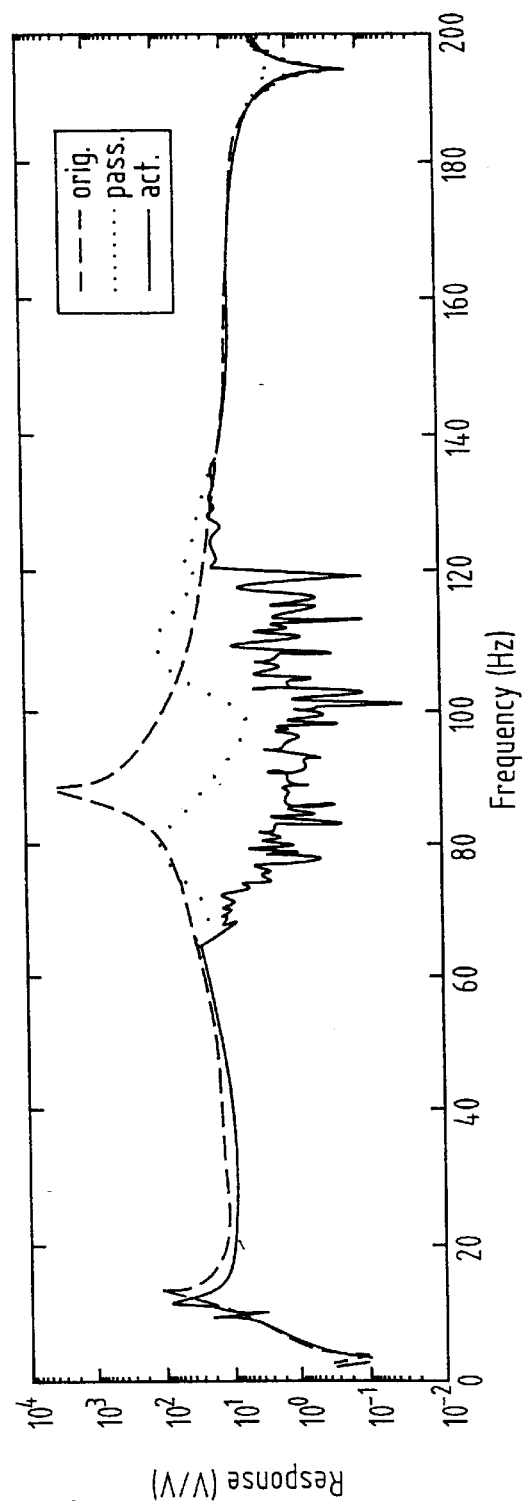
FIG. 8B is a graphic illustration of three normalized error signal response spectra associated with a dual reactive mass absorber according to the invention (experimental results)

FIG. 8A shows the normalized frequency response of the error signal for the undamped system (long broken lines), for the system with the passive single reaction mass absorber (short broken lines) for the system with the conventional active single reaction mass absorber (solid line). FIG. 8B shows the normalized frequency response of the error signal for the undamped system (long broken lines), for the system with the passive dual reaction mass absorber (short broken lines) for the system with the inventive active dual reaction mass absorber (solid line).

As shown by the differences between FIGS. 8A and 8B, the inventive dual reaction mass absorber achieved higher attenuation of the second mode (around an additional 3.6 dB reduction between 60 and 120 Hz).

Specifically, the frequency response for the active absorbers (i.e., solid lines in FIGS. 8A and 8B) illustrate that the dual reaction mass absorber produces a lower response (i.e., less vibration) than the single reaction mass absorber (and in a slightly broader frequency range (i.e., 60–120 Hz for the single reaction mass absorber vs. 70–110 Hz for the dual reaction mass absorber).

The inventive dual reaction mass absorber clearly requires a smaller control signal around the second mode of the beam (i.e. at 83 Hz). The overall reduction in required control signal is 5.9 dB which is equivalent to a reduction by a factor of two.

The spectra presented in FIGS. 8A, 8B and 9 correspond to fully converged compensators (i.e., after a brief start up period).

Figure 10:
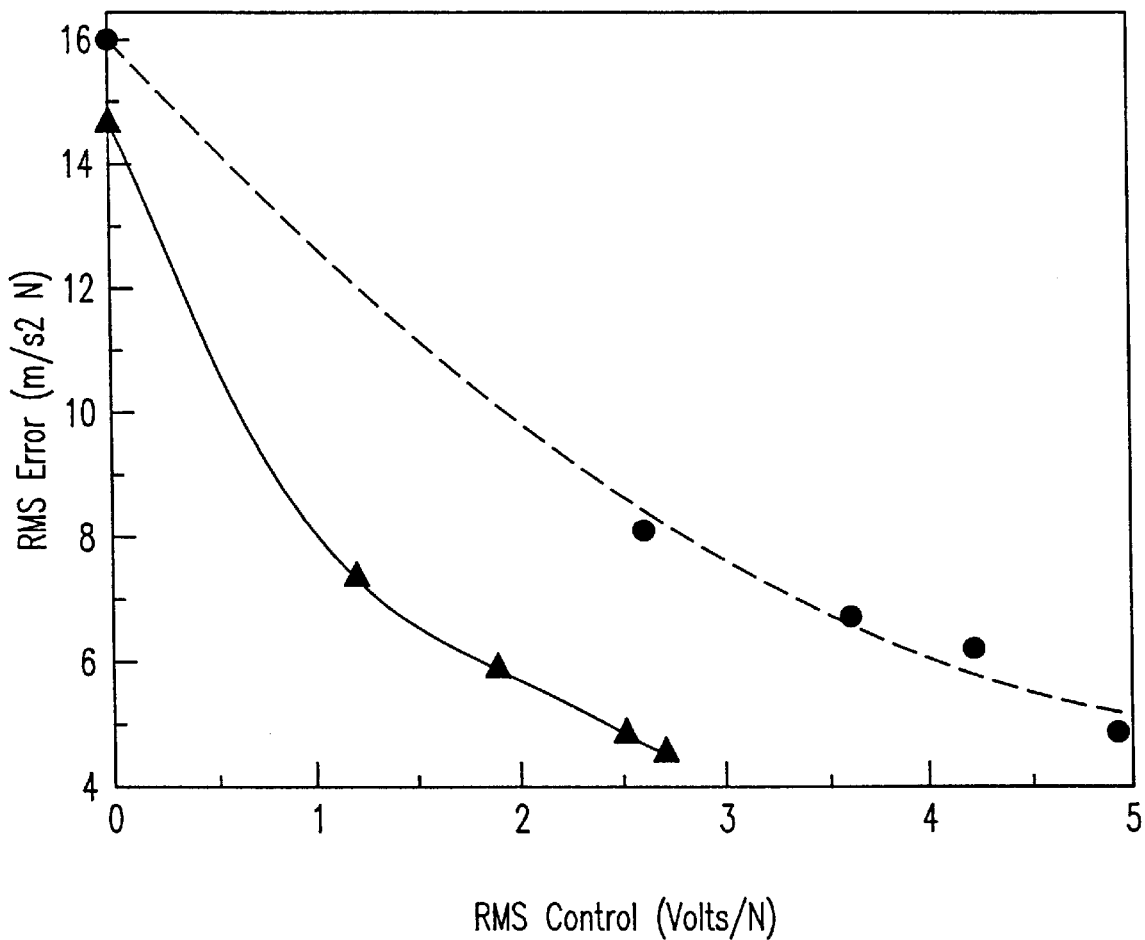
FIG. 10 is a graphic illustration of the error signal RMS value integrated over the [20–200 Hz] band as a function of the control signal RMS value integrated over the same frequency range for both the single and dual reactive mass absorbers (experimental results)

The performance of the dual mass and single mass absorbers in various stages of the convergence process is summarized in FIG. 10. FIG. 10 shows the error signal RMS value integrated over the [20–200 Hz] band as a function of the control signal RMS value integrated over the same frequency range. The control signal for the single reaction mass absorber is shown as a dotted line and the control signal for the dual reaction mass absorber is shown as a solid line.

For all error signal reductions, the inventive dual mass absorber required a lower control effort than the single mass absorber. For example, to reduce the error signal RMS value to 5.8 m/Ns2, the dual mass absorber required 1.9 Volts/N (RMS) compared to 4.2 Volts/N (RMS) needed by the single mass absorber. In this example the reduction in the required control signal was 6.9 dB.

In another test to demonstrate the advantage of the dual reaction mass absorber over the single reaction mass absorber, a computer simulation of the control of a building structure was carried out using both the inventive and conventional absorbers.

In the computer simulation, the structure to be controlled was selected to be an eight story building modeled as a single-degree-of-freedom system. The system was assumed to be excited at the base with a broadband ground motion.

Figure 11:
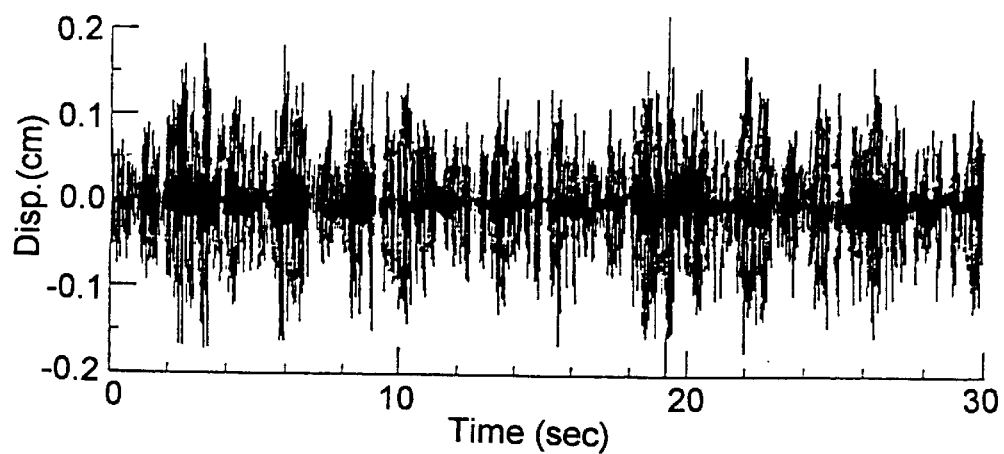
FIG. 11 is a graphic illustration of the undamped vibration of a simulated building structure.
Figure 12A:
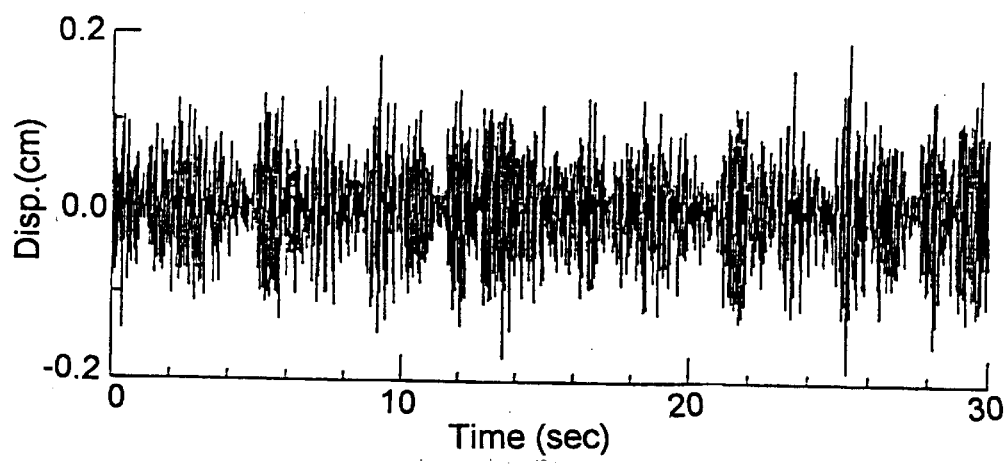
FIG. 12A is a graphic illustration of the vibration of FIG. 11 damped with a passive single reactive mass absorber for a simulated building structure.
Figure 12B:
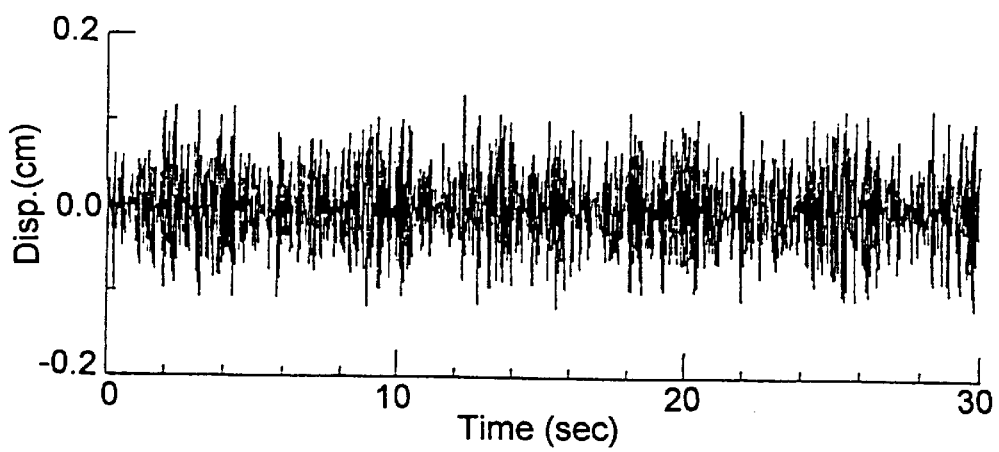
FIG. 12B is a graphic illustration of the vibration of FIG. 11 damped with a passive dual reactive mass absorber according to the invention for a simulated building structure.

FIGS. 11–14B illustrate the time histories of the error and control signals in the above example. FIG. 11 shows the error signal (i.e., vibration) of the undamped building. FIGS. 12A and 12B show the error signal of the building with the passive single mass and dual mass absorbers, respectively. FIGS. 12A and 12B demonstrate both the passive single and passive dual reaction mass absorbers achieved similar error signal attenuation.

Figure 13A:
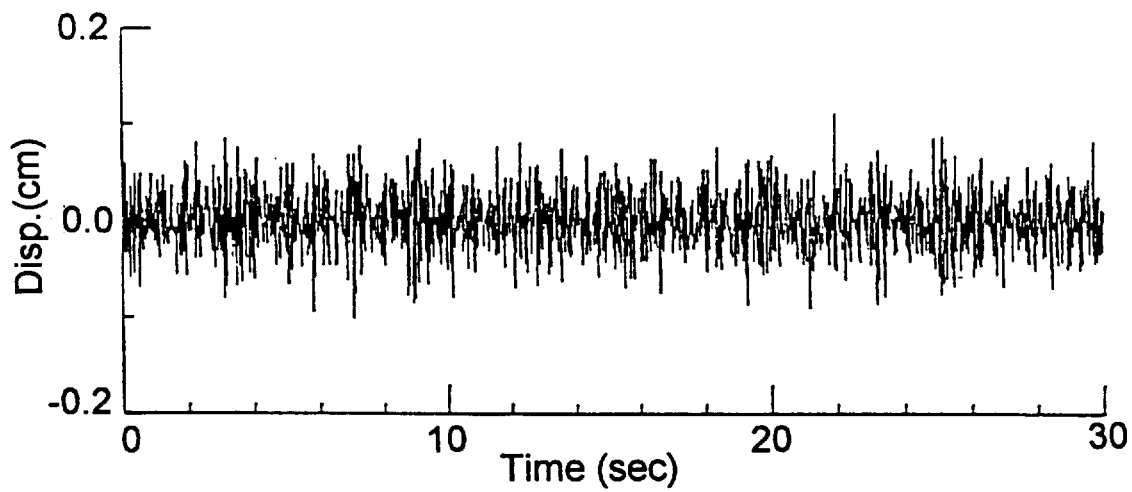
FIG. 13A is a graphic illustration of the vibration of FIG. 11 damped with an active single reactive mass absorber for a simulated building structure.
Figure 13B:
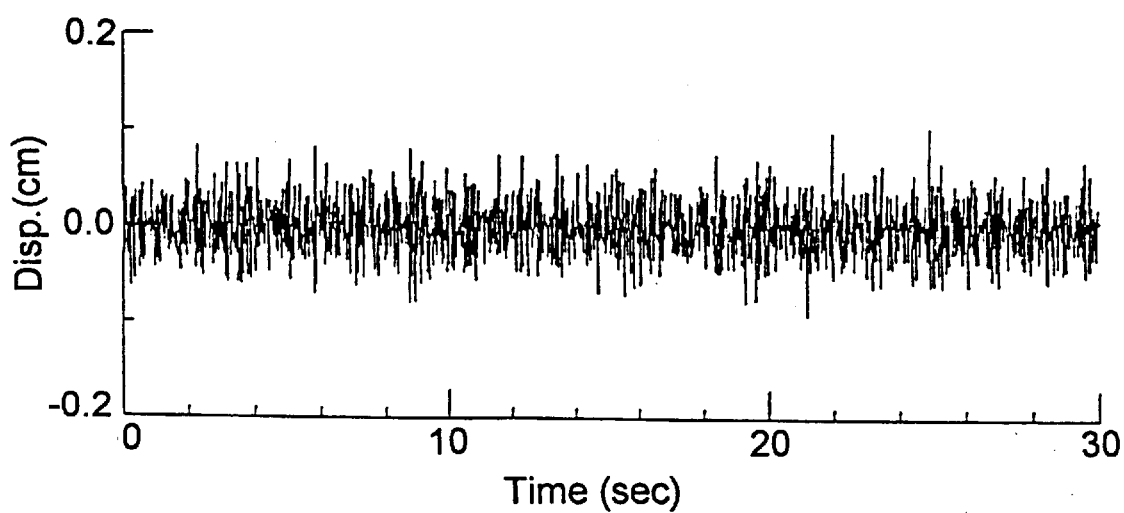
FIG. 13B is a graphic illustration of the vibration of FIG. 11 damped with an active dual reactive mass absorber according to the invention for a simulated building structure.

FIGS. 13A and 13B show the error signal with the active single mass and dual mass absorbers, respectively after full convergence of the compensator. Again, both active absorbers achieved similar attenuation of the error signal.

Figure 14A:
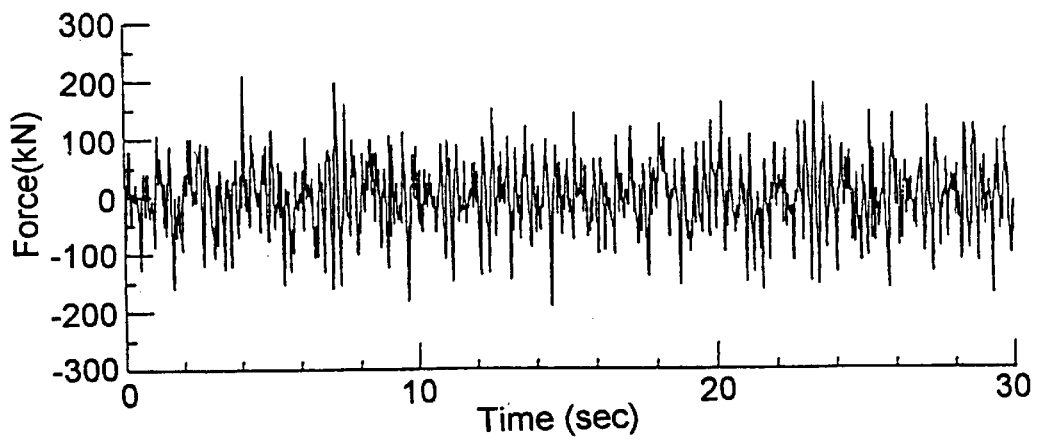
FIG. 14A is a graphic illustration of a control force associated with the active single reactive mass associated with the vibration illustrated in FIG. 13A for a simulated building structure.
Figure 14B:
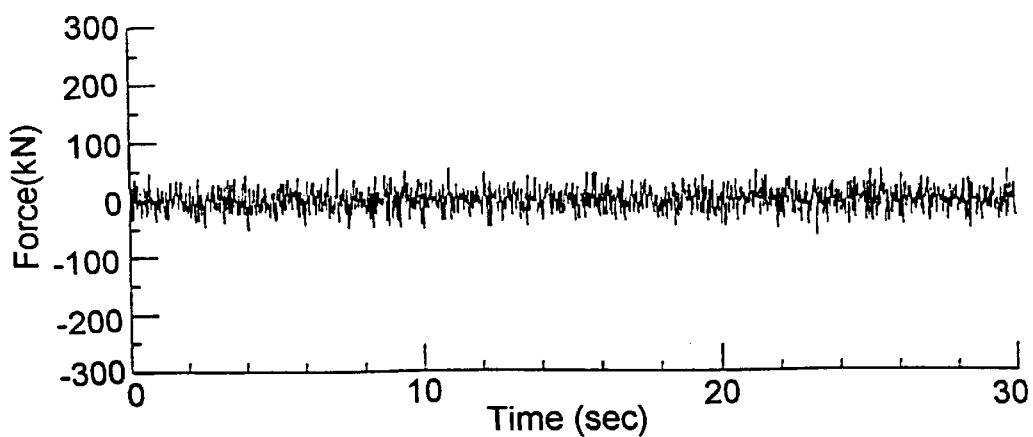
FIG. 14B is a graphic illustration of a control force associated with the active dual reactive mass according to the invention associated with the vibration illustrated in FIG. 13B for a simulated building structure.

FIGS. 14A and 14B show the control signal required by the single mass and dual mass absorbers, respectively, to achieve the error signals shown in FIGS. 13A and 13B. The required active force by the dual reaction mass absorber is nearly one-fourth of that required for the single reaction mass system.

The inventive absorber offers a number of advantages over the conventional single reaction mass system. An important advantage is that the invention requires significantly smaller active forces to attenuate the same structural response. Thus, the components of the active system can be designed to be smaller, more compact, and lighter than a conventional single mass absorber. The inventive absorber is also effective over a wider frequency range and is less sensitive to system variations than the single mass system.

An active dynamic vibration absorber is discussed above that includes two or more reaction masses with the control forces applied between the reaction masses. Conventionally, the control force is applied between a single reaction mass and a structure to be controlled.

The above experimental and numerical results clearly demonstrate that the inventive dual-mass absorber produces better vibration attenuation with significantly less control effort when compared to a conventional single mass absorber.

The impact of this invention will be significant because it has a number of advantages over the conventional single reaction mass absorber. Specifically the inventive absorber achieves the same or better structural response reduction with smaller control forces, is effective over a wider frequency range and is less sensitive to system parameter changes than conventional dampers.

Having thus described our invention, what we claim as new and desire to secure by Letters Patent is as follows:

1. An active vibration absorber comprising:
   a frame connected to an element to be controlled;
   at least two reaction mass elements;
   spring means for separately connecting each of said reaction mass elements to said frame so that each of said reaction mass elements are independently movable with respect to said frame and other reaction mass elements; and
   means for generating an equal and opposite force between said reaction mass elements so that said reaction mass elements move relative to each other for damping vibration.

2. An active vibration absorber as in claim 1, wherein said controlling means comprises an actuator positioned between said reaction mass elements.

3. An active vibration absorber as in claim 1, further comprising spring-damper means for connecting said mass elements to one another.

4. An active vibration absorber as in claim 1, wherein said controlling means exerts a first force in a first direction on a first mass element of said mass elements and exerts a second force in a second direction on a second mass element of said mass elements,
   wherein said first force is equal to said second force and said first direction is opposite that of said second direction.

5. An active vibration absorber as in claim 1, wherein said controlling means comprises one of:
   a voice coil and a rare earth magnet;
   a hydraulic system; and
   a piezoelectric generator.

6. An active vibration absorber comprising:
   a structure upon which a force acts to cause movement;
   at least two reaction mass elements;
   spring means for separately connecting each of said reaction mass elements to said structure so that each of said reaction mass elements are independently movable with respect to said structure and other reaction mass elements; and
   means for generating an equal and opposite force between said reaction mass elements so that said reaction mass elements move relative to each other for damping vibration.

7. A system as in claim 6, wherein said controlling means comprises an actuator positioned between said reaction mass elements.

8. A system as in claim 6, further comprising spring-damper means for connecting said mass elements to one another.

9. A system as in claim 6, wherein said controlling means exerts a first force in a first direction on a first mass element of said mass elements and exerts a second force in a second direction on a second mass element of said mass elements,
   wherein said first force is equal to said second force and said first direction is opposite that of said second direction.

10. A system as in claim 6, wherein said controlling means comprises one of:
    a voice coil and a rare earth magnet;
    a hydraulic system; and
    a piezoelectric generator.

11. A system as in claim 6, further comprising:
    a fixed surface connected to said structure; and
    spring-damper means for connecting said structure to said fixed surface.

* * * * *